United States Patent [19]

Cella

[11] 4,086,091

[45] Apr. 25, 1978

[54] METHOD OF APPLYING AND CURING EPOXY COATING COMPOSITIONS USING DICARBONYL CHELATE OF GROUP IIIA-VA ELEMENT AND UV IRRADIATION

[75] Inventor: James A. Cella, Clifton Park, N.Y.

[73] Assignee: General Electric Company, Schenectady, N.Y.

[21] Appl. No.: 798,784

[22] Filed: May 20, 1977

[51] Int. Cl.$^2$ .................. B05D 3/06; C08G 59/70
[52] U.S. Cl. .................. 96/36.2; 96/115 P; 260/2 EC; 260/47 EC; 260/59 EP; 260/448.2 B; 260/448.8 A; 260/830 TW; 427/44; 427/54; 428/413; 526/24; 526/27; 526/29
[58] Field of Search .............. 427/54, 53, 44; 260/2 EC, 448.8 R, 448.8 A, 448.2 B; 428/413; 96/36.2, 36.1, 115 P

[56] References Cited

U.S. PATENT DOCUMENTS

| 3,624,121 | 11/1971 | Selin | 260/448.8 R |
|---|---|---|---|
| 3,720,634 | 3/1973 | Statton | 260/2 EC |
| 3,956,241 | 5/1976 | Steele et al. | 260/2 EC |
| 3,960,684 | 6/1976 | Feinberg | 260/2 EC |

*Primary Examiner*—John H. Newsome
*Attorney, Agent, or Firm*—William A. Teoli; Joseph T. Cohen; Jerome C. Squillaro

[57] ABSTRACT

A method for effecting the thin section cure of an epoxy resin is provided, based on the use of a moisture sensitive dicarbonyl chelate of a Group IIIa-Va element. Rapid cure of the applied epoxy composition can be achieved under ultraviolet radiation.

16 Claims, No Drawings

METHOD OF APPLYING AND CURING EPOXY COATING COMPOSITIONS USING DICARBONYL CHELATE OF GROUP IIIA-VA ELEMENT AND UV IRRADIATION

The present invention relates to the use of a photosensitive, dicarbonyl chelate of a Group IIIa-Va element to effect the cure of an epoxy resin on a substrate by the use of ultraviolet light.

In copending applications Ser. Nos. 638,982, 638,983 and 638,994, of James V. Crivello, Filed December 9, 1975 and assigned to the same assignee as the present invention, there are shown UV Curable Epoxy compositions having certain onium salts as photoinitiators. In my copending application Ser. No. 798,783 filed May 20, 1977 for Curable Compositions, filed concurrently herewith and assigned to the same assignee as the present invention, moisture curable compositions are shown comprising epoxy resin and an effective amount of a dicarbonyl chelate of Group IIIa-Va element. The aforementioned 1,3-dicarbonyl chelate or "diketone chelate" has the formula,

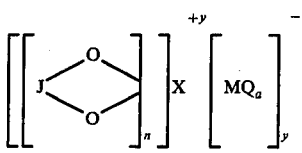

where X is a main row element selected from Group IIIa, IVa and Va, J is a divalent organo radical having 3 to 42 carbon atoms, M is an element selected from Sb, As, P, B, and Cl, Q is halogen or oxygen, $n$ is an integer equal to 2 or 3, $y$ is an integer equal to 1 or 2, and $a$ is an integer equal to 4 to 6 or the valence of M. The use of the above described moisture sensitive curable compositions overcomes many of the disadvantages experienced in curing epoxy compositions of the prior art. However, the cure time of such epoxy compositions is at least 2 hours or more which precludes its use in certain coating applications requiring cures in less than 5 minutes.

The present invention is based on the discovery that epoxy compositions comprising an epoxy resin and an effective amount of the dicarbonyl chelate of formula (1) can be cured in less than 5 minutes, if the curable resin is applied onto a substrate and subjected to ultraviolet radiation. This result is quite surprising, since there is a significant difference between the dicarbonyl chelate of formula (1), and the above metioned onium salts of James V. Crivello with respect to the mechanism by which cure of the epoxy resin is achieved. One possible explanation as to how cure of epoxy is accelerated under UV light using the moisture sensitive dicarbonyl chelates of formula (1), is that the moisture initiated cure is accelerated with ultraviolet light.

In accordance with the present invention, there is provided a method for coating a substrate which comprises (1) applying onto the substrate, a composition comprising (A) an epoxy resin polymerizable to a high molecular weight state selected from epoxy monomer, epoxy prepolymer, oxirane containing organic polymer and mixtures thereof, and (B) an effective amount of a moisture sensitive dicarbonyl chelate of formula (1), (2) subjecting the resulting treated substrate of (1) to ultraviolet radiation until a tack-free cured coating is obtained on said substrate.

Radicals included by J of formula (1) are, for example,

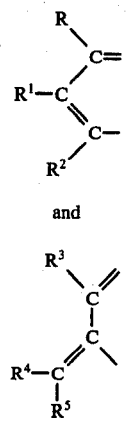

where R and $R^2$ are selected from hydrogen, amino, saturated $C_{(1-8)}$ aliphatic hydrocarbon, saturated $C_{(1-8)}$ cycloaliphatic hydrocarbon, unsaturated $C_{(1-8)}$ aliphatic hydrocarbon, unsaturated $C_{(1-8)}$ cycloaliphatic, $C_{(6-13)}$ aromatic, substituted $C_{(6-13)}$ aromatic, $C_{(1-8)}$ alkoxy, and halogenated derivatives thereof, etc.; $R^1$ is selected from halogen, R and $R^2$; R, $R^1$ and $R^2$ also can be part of the same cycloaliphatic radical; $R^3$ is selected from hydrogen, amino, $C_{(1-8)}$ aliphatic, $C_{(1-8)}$ cycloaliphatic, $C_{(6-13)}$ aromatic, $C_{(1-8)}$ alkoxy and substituted derivatives thereof, etc.; $R^4$ and $R^5$ are selected from halogen $R^2$ and $R^3$; $R^3$ and $R^5$, and $R^3$, $R^4$ and $R^5$ can be part of a cycloaliphatic or aromatic ring, respectively.

Included in the carbonyl chelates of formula (1) are chelates, such as

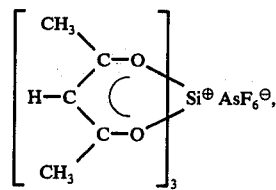

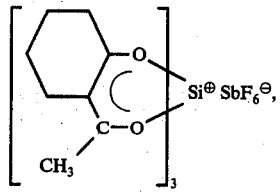

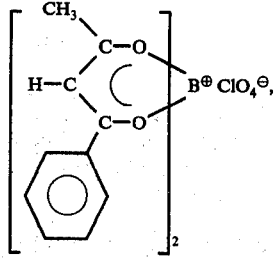

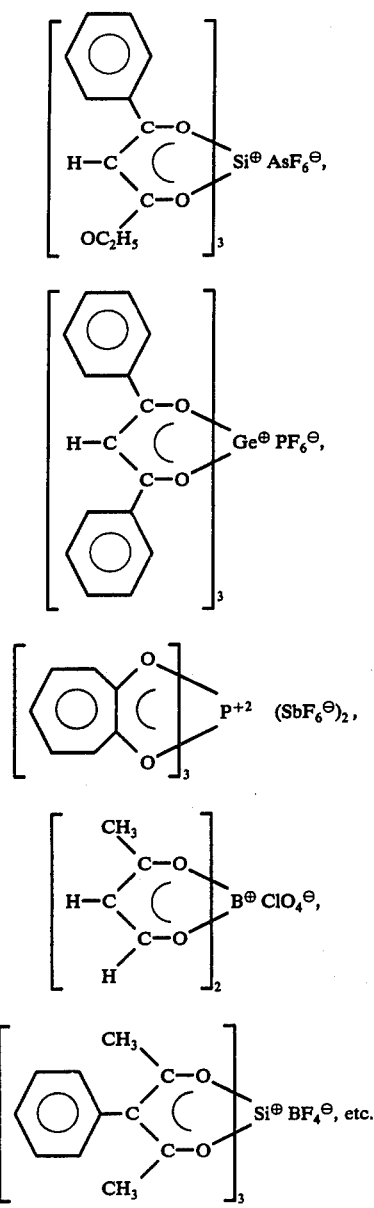

The dicarbonyl chelates of formula (1) can be prepared by a metathetical reaction between an alkali metal salt of an $MQ_a$ acid with the halide salt of a chelate prepared by the direct reaction of a 1,3-dicarbonyl ligand with a halide of an appropriate X in the presence of an organic solvent under anhydrous conditions by procedures shown by R. West, J. Amer. Chem Soc., 80, 3246 (1958), E. L. Muetterties and A. N. Wright, J. Amer. Chem. Soc., 86, 5132 (1964), R. Riley, R. West and R. Barbarian, Inorg. Syn., 1, 30 (1963), W. Dilthey, Ann. 344, 300 (1906) and R. West, J. Org. Chem., 23, 1552 (1958).

The term "epoxy resin" as utilized in the description of the curable compositions of the present invention, includes any monomeric, dimeric or oligomeric or polymeric epoxy material containing one or a plurality of epoxy functional groups. For example, those resins which result from the reaction of bisphenol-A (4,4′-isopropylidenediphenol) and epichlorohydrin, or by the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Plueddemann and G. Fanger, J. Am. Chem. Soc. 81 632-5 (1959). As described in the literature, epoxy resins can also be modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995; etc. Further examples of epoxy resins which can be used are shown in the Encyclopedia of Polymer Science and Technology, Vol. 6, 1967, Interscience Publishers, New York, pp 209,271.

In the practice of the invention, the UV curable compositions can be made by blending together the epoxy resin and the dicarbonyl chelate. In instances where the epoxy resin and the dicarbonyl chelate are incompatable, a suitable organic solvent can be used to facilitate the mixing of the ingredients. Some of the organic solvents are chloroform, methylene chloride, acetone, etc.

In order to avoid premature cure of the resulting mixture, mixing of the ingredients should be performed under substantially anhydrous conditions and thereafter kept in the absence of moisture and visible light.

The curable mixture can be employed as an insulating coating on a variety of substrates, such as aluminum strip, silicon steel strip, copper wire, aluminum wire, thermoplastic sheet, glass fibers, etc. Application of the UV curable compositions can be effected by standard procedures, such as dipping, spraying, use of a roller coater, curtain coater, etc. After the UV curable composition has been applied to a thickness of from 1 to 3 mils, it can be subjected to a UV irradiation derived from an ultraviolet lamp source. One or more ultraviolet lamps, such as from 1 to 200 discharge lamps, for example, xenon, metallic halide, metallic arc, such as mercury vapor discharge lamp, etc., having an operating pressure of from 1 to 10 atmospheres, etc., can be employed. The lamps can include envelopes capable of transmitting light of a wavelength of from about 1,849 A to 4,000 A, and preferably 2,400 A to 4,000 A. The lamp envelope can consist of quartz, such as Spectrocil, etc. Typical lamps which can be employed for providing ultraviolet radiation are, for example, medium pressure mercury arcs, such as the G.E. H3T7 arc, etc.

In operating the lamp to achieve a desirable level of flux intensity required for effecting cures of the solventless resin in a pollution free manner, the lamps can be ballasted to provide a higher watts per inch input than that normally rated by the manufacturer. For example, the GE H3T7 lamp normally operated at 130 watts per inch, can be operated at up to 300 watts per inch input over a satisfactory operating life.

In addition to the above described lamp means for generating ultraviolet radiation employed in the practice of the invention, the means for providing such ultraviolet radiation in the apparatus used therein also includes radiation filtering means, such as quartz windows, employed in combination with the lamp and reflector to provide means for ultraviolet radiation having a wavelength of from between about 1,849 A to 4,000 A, while effecting the removal of radiation greater than 7,500 A.

In order that those skilled in the art will be bettter able to practice the invention, the following examples are given by of illustration and not by way of limitation. All parts are by weight, except where otherwise indicated.

EXAMPLE 1.

A solution of 18 ml of acetyl acetone and 20.5 ml of silicon tetrachloride in 80 ml of dry benzene was refluxed for one hour. The cooled mixture was filtered and the collected product was dried 15 hours in a vacuum desiccator. The dried material had a melting point of 174–176 degrees centrigrade and weighed 20.6 grams. Based on method of preparation and $^{29}$Si NMR spectra, the product was tris-acetyl acetonato silicon (IV) chloride hydrochloride.

A solution of one gram of the above tris-acetyl acetonato silicon (IV) chloride hydrochloride in 5 ml of methylene chloride was mixed with 0.5 grams of sodium hexafluorophosphate and 5 ml of a mixture of methylene chloride and acetone. The mixture was heated on a steam bath until evolution of hydrogen chloride was completed. The cooled solution was diluted with ether and the precipitate product was collected by filtration. There was obtained 1.0 gram of solids which were redissolved in methylene chloride, filtered and reprecipitated with ether. There was obtained 0.6 gram of the corresponding hexafluorophosphate chelate having a melting point of 136°–140° C and the formula,

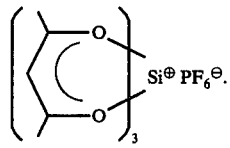

A solution of 0.1 gram of the above chelated silane and 0.5 grams of an epoxy resin having the formula,

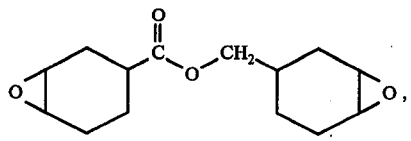

and sufficient chloroform to produce a homogeneous mixture was poured onto an aluminum substrate to produce a 3 mil resin coating. The treated aluminum strip was then irradiated using a GE H3T7 lamp at a distance of about 4 inches. It was found that a tack-free film was obtained after about 30–60 seconds.

The same procedure was repeated, except that in place of the above epoxy resin, the was used diglycidyl ether of Bisphenol-A. After 5 minutes irradiation of a treated aluminum strip, it was found that the resulting epoxy resin was substantially cured.

EXAMPLES 2–5.

In accordance with the procedure of Example 1, 2% solutions of several additional chelates and the bis(cyclohexene oxide) epoxy resin were prepared. For example, tris-acetyl acetonato silicon (IV) hexafluoroantimonate was prepared by effecting reaction between 1 part of tris-acetyl acetonato silicon (IV) hydrochloride with 0.8 part of sodium hexafluoroantimonate and about 5 parts of acetone. Sodium chloride was removed by filtration, followed by treatment of the filtrate with dry ether to produce 0.6 parts of tris-acetyl acetonato silicon (IV) hexafluoroantimonate. The various UV curable compositions were respectively applied onto aluminum substrates to a thickness of about 2 mil and exposed to ultraviolet radiation using a GE H3T7 lamp at a distance of about 4 inches. Exposure time was based on the period under the lamp to obtain a tack-free film. The following results were obtained where "salt" represents the particular tris-acetyl acetonato silicon (IV) chelate used and "cure time" indicates the time required to produce a tack-free film:

| Salt | Cure Time (Min) |
|---|---|
| $PF_6$ | 3.0 |
| $SbF_4$ | 0.5 |
| $AsF_6$ | 2.0 |
| $BF_4$ | 10.0 |

The above results show that the hexafluoro salts provided faster cure than the tetrafluoroborate salts.

EXAMPLE 6.

Reaction was effected between 2 grams of acetylacetone in 5 ml of methylene chloride with 10 ml of a 0.2 molar solution of boron trichloride. When gas evolution ceased, the solution was diluted with 50 ml of ether and the chloride salt was isolated. The corresponding boronium hexafluoroantimonate salt was prepared by mixing the aforementioned methylene chloride salt solution with 1.5 grams of sodium hexafluoroantimonate dissolved in acetone. The sodium chloride which was formed was removed by filtration and the desired dicarbonyl boronium hexafluoroantimonate salt was isolated by elution of the filtrate with ether, followed by filtration.

A curable composition was prepared by dissolving 0.2 gram of the above dicarbonyl chelate and 10 grams of the bis(cyclohexene oxide) epoxy resin of Example 1. The resulting curable composition was applied onto a fiber glass substrate and exposed to ultraviolet light as described in Example 1. After 2 minutes of exposure, the treated fiber glass substrate was found to be tack-free.

EXAMPLE 7.

A solution of 9.8 grams of dibenzoyl methane and 5.1 ml of silicon tetrachloride and 40 ml of dry benzene was refluxed for 30 minutes. The precipitate salt was collected by filtration. A solution of 1.5 grams of the crude salt in chloroform and equal volumes of chloroform and acetone was mixed with 0.5 grams of sodium hexafluoroantimonate in acetone. After removal of sodium chloride by filtration and precipitation of the resulting chelate from the filtrate with ether there was obtained 1.3 grams of tris-dibenzoyl methanato silicon (IV) hexafluoroantimonate as yellow prisms. Its melting point was 270°-271.5° C.

A curable composition was prepared by dissolving 0.1 gram of the above dicarbonyl chelate into 2 ml of acetone and then adding 0.5 gram of the bis(cyclohexene oxide) epoxy resin of Example 1. The resulting UV curable composition was then applied onto a steel substrate and irradiated as described in Example 1. The tack-free film was obtained in two minutes.

EXAMPLE 8.

A tris-tropolonate dichloride chelate of phosphorus was prepared by mixing a solution of 8.4 grams of phosphorus pentachloride in methylene chloride with a solution of 1.5 grams of tropolone in methylene chloride. There was reacted 0.5 grams of the aforementioned chelate with two equivalents of sodium hexafluoroantimonate to yield the corresponding bis-hexafluoroantimonate chelate.

A curable composition was prepared by adding 1 part of the above dicarbonyl chelate to about 100 parts of the epoxy resin used in Example 1, along with sufficient acetone to produce a homogeneous solution. The resulting curable mixture was applied onto a ceramic substrate and cured by irradiating the applied composition with ultraviolet light in accordance with the procedure of Example 1. A tack-free film was obtained after 3 minutes of exposure.

EXAMPLES 9-19

Additional dicarbonyl chelates were prepared following the procedure previously described. The dicarbonyl chelates were respectively mixed with the diepoxide of Example 1 to produce curable mixtures having about 1% by weight of the dicarbonyl chelate. The following table shows the dicarbonyl chelates which were prepared, where "J", "X" and "MQa" are defined in formula (1):

| J | X | MQa |
|---|---|---|
| 1-phenyl-1,3-butenyl | Si | $SbF_6$ |
| 1-ethylcyclohex-1-en-2-yl | Si | $SbF_6$ |
| 1,2-cyclohepta-2,4,6-trienyl | Ge | $SbF_6$ |
| 1-ethyl-cyclopent-1en-2-yl | Si | $SbF_6$ |
| 1,3-diphenylpropenyl | B | $SbF_6$ |
| 5-ethoxy-2,4-pent-2-enyl | Si | $SbF_6$ |
| 2,4-pent-2-enyl | Si | $ClO_4$ |
| 1,2-cyclohepta-2,4,6-trienyl | Si | $SbF_6$ |
| 1-ethylcyclopent-1-en-2-yl | Si | $ClO_4$ |
| 1,3-diphenylpropenyl | Ge | $SbF_6$ |
| 3-chloro-2,4-pent-2-enyl | Si | $SbF_6$ |

The above curable compositions were found to cure to a hard tack-free film after being applied to a thickness of about 1 mil on a steel substrate and exposed to a GE H3T7 lamp at a distance of about 4 inches for ten minutes.

EXAMPLE 20.

A UV curable composition was prepared by dissolving 2 parts of tris-acetyl acetonato silicon (IV) hexafluoroantimonate and two parts of chloroform and 100 parts of an epoxy resin in the form of a diglycidyl ether of Bisphenol-A. The UV curable mixture was applied onto a copper substrate and a mask having a patterned configuration for electronic components was placed over the treated substrate. The resulting composite structure was then exposed to ultraviolet light for five minutes following the procedure of Example 1. The mask was then removed and the substrate was developed in acetone whereby unexposed portions of the treated substrate were washed away. There was obtained a negative photoresist of the mask on the substrate. This procedure showed that the UV curable compositions of the present invention could be utilized as photoresists in making electronic components and integrated circuits.

Although the above examples are directed to only a few of the very many variables included in the method of the present invention, it should be understood that the method of the present invention can include a much broader variety of dicarbonyl chelates of formula (1) and epoxy resins which are set forth in the description preceding these examples.

What I claim as new and desire to secure by Letters Patent of the United States is:

1. A method for coating a substrate which comprises
   (1) applying onto the substrate a composition comprising
      (A) an epoxy resin polymerizable to a high molecular weight state selected from epoxy monomer, epoxy prepolymer, oxirane containing organic polymer and mixtures thereof, and
      (B) an effective amount of a 1,3-dicarbonyl chelate of the formula,

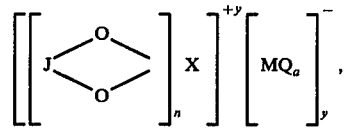

where X is a main row element selected from Group IIIa, IVa and Va, J is a divalent organo radical having 3 to 42 carbon atoms, M is an element selected from Sb, As, P and B, and Cl, Q is halogen or oxygen, n is an integer equal to 2 or 3, y is an integer equal to 1 or 2, and a is an integer equal to 4 to 6 or the valence of M,
   (2) subjecting the resulting treated substrate of (1) to ultraviolet radiation until a tack-free cured coating is obtained on said substrate.

2. A method in accordance with claim 1, where X of the 1,3-dicarbonyl chelate is silicon.

3. A method in accordance with claim 1, where X of the 1,3-dicarbonyl chelate is boron.

4. A method in accordance with claim 1, where X of the 1,3-dicarbonyl chelate is phosphorus.

5. A method in accordance with claim 1, where X of the 1,3-dicarbonyl chelate is germanium.

6. A method in accordance with claim 1, where the dicarbonyl chelate is tris-acetyl acetonato silicon (IV) hexafluorophosphate.

7. A method in accordance with claim 1, where the dicarbonyl chelate is tris-acetyl acetonato silicon (IV) hexafluoroantimonate.

8. A method in accordance with claim 1, where the dicarbonyl chelate is tris-acetylacetonato silicon (IV) hexafluoroarsenate.

9. A method in accordance with claim 1, where the dicarbonyl chelate is tris-acetylacetonato silicon (IV) tetrafluoroborate.

10. A method in accordance with claim 1, where the dicarbonyl chelate is tris-acetylacetonato silicon (IV) perchlorate.

11. A method in accordance with claim 1, where the dicarbonyl chelate is tris-tropolonato silicon (IV) hexafluoroantimonate.

12. A method in accordance with claim 1, where the dicarbonyl chelate is tris-dibenzoylmethanato silicon (IV) hexafluoroantimonate.

13. A method in accordance with claim 1, where the dicarbonyl chelate is tris-2-acetylcyclohexanato silicon (IV) hexafluoroantimonate.

14. A method in accordance with claim 1, where the dicarbonyl chelate is tris-2-acetylcyclopentanato silicon (IV) hexafluoroantimonate.

15. A method in accordance with claim 1, where the dicarbonyl chelate is tris-ethylbenzoyl acetato silicon (IV) hexafluoroantimonate.

16. A printed circuit made in accordance with the method of claim 1.

* * * * *